United States Patent
Ohlig et al.

(10) Patent No.: US 7,296,861 B2
(45) Date of Patent: Nov. 20, 2007

(54) BRAKE SYSTEM FOR A MOTOR VEHICLE

(75) Inventors: Benedikt Ohlig, Vallendar (DE); Wilfried Giering, Mendig (DE); Erwin Michels, Kail (DE)

(73) Assignee: Lucas Automotive GmbH (DE)

( * ) Notice: Subject to any disclaimer, the term of this patent is extended or adjusted under 35 U.S.C. 154(b) by 0 days.

(21) Appl. No.: 11/255,621

(22) Filed: Oct. 21, 2005

(65) Prior Publication Data

US 2006/0033383 A1 Feb. 16, 2006

Related U.S. Application Data

(63) Continuation of application No. PCT/EP2004/003652, filed on Apr. 6, 2004.

(30) Foreign Application Priority Data

Apr. 25, 2003 (DE) ................. 103 18 850

(51) Int. Cl.
*B60T 7/00* (2006.01)
(52) U.S. Cl. .............. 303/15; 303/114.1; 303/155; 303/DIG. 11
(58) Field of Classification Search .......... 303/15, 303/3, 10, 9.62, 114.1, 113.3, 113.4, 113.5, 303/115.5, 155, 116.1, 116.2, DIG. 11
See application file for complete search history.

(56) References Cited

U.S. PATENT DOCUMENTS 4,950,038 A 8/1990 Ocvirk et al.

6,065,815 A 5/2000 Terazawa et al.
6,290,307 B1 9/2001 Poertzgen et al.

FOREIGN PATENT DOCUMENTS

| DE | 30 11 493 | | 10/1981 |
|---|---|---|---|
| DE | 35 23 776 | | 1/1987 |
| DE | 195 42 656 | | 5/1997 |
| GB | 2075607 A | * | 11/1981 |
| GB | 2 132 295 | | 7/1984 |
| GB | 2177468 A | * | 1/1987 |
| JP | 61165004 | | 7/1986 |

* cited by examiner

*Primary Examiner*—Pam Rodriguez
(74) *Attorney, Agent, or Firm*—MacMillan, Sobanski & Todd, LLC

(57) ABSTRACT

The invention relates to a brake system for a motor vehicle comprising a master brake cylinder in which a primary piston for generating a brake pressure in a hydraulic brake circuit can be displaced according to actuation of a brake pedal, it being possible to displace the primary piston under the effect of a hydraulic servo pressure circuit in the master brake cylinder and the hydraulic servo pressure circuit comprising a pressure source for generating the servo pressure and a pressure accumulator for maintaining a minimum servo pressure in the servo pressure circuit. It is provided in this brake system that the pressure accumulator of the servo pressure circuit can be supplied with hydraulic fluid as a function of the servo pressure prevailing in the servo pressure circuit.

9 Claims, 5 Drawing Sheets

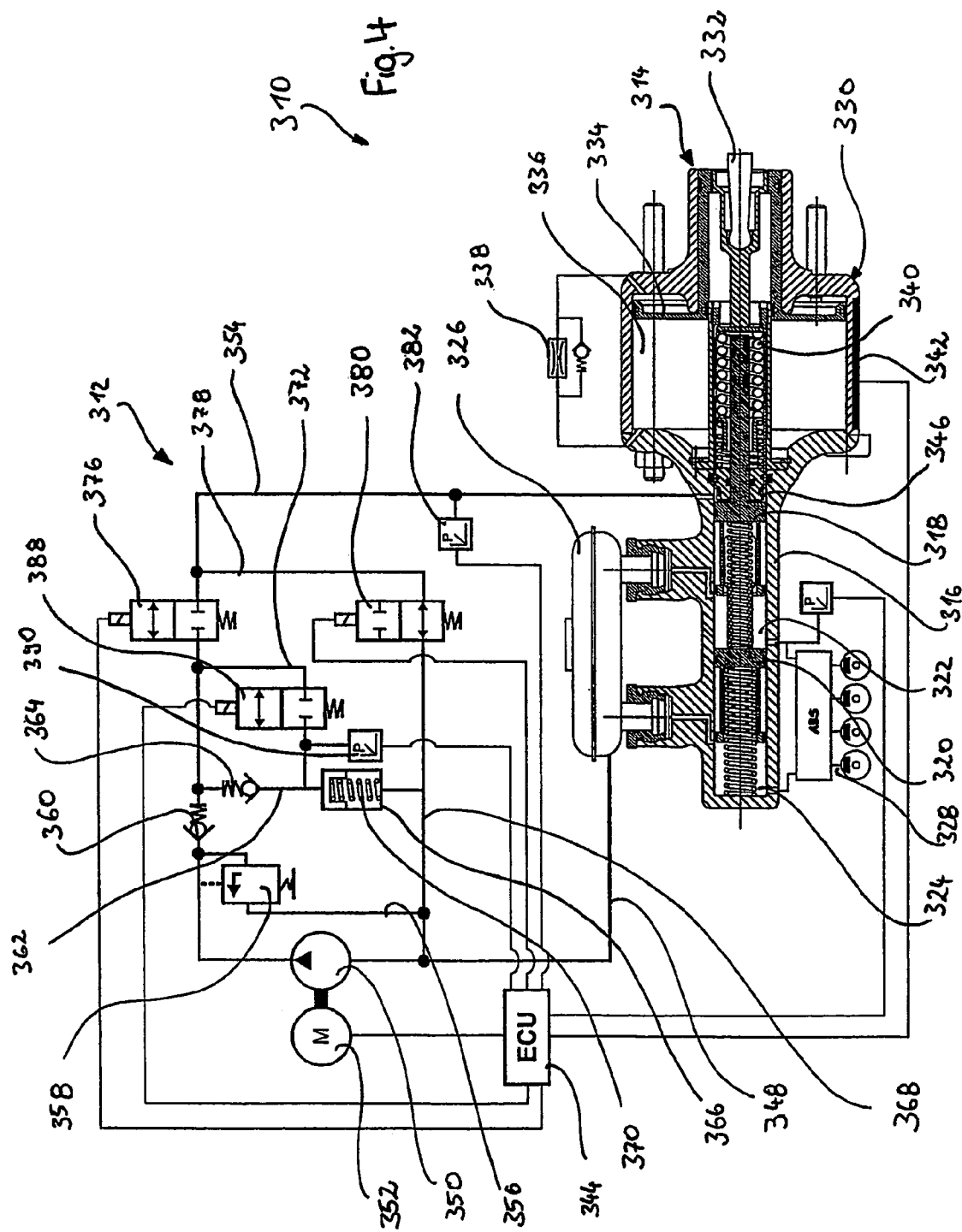

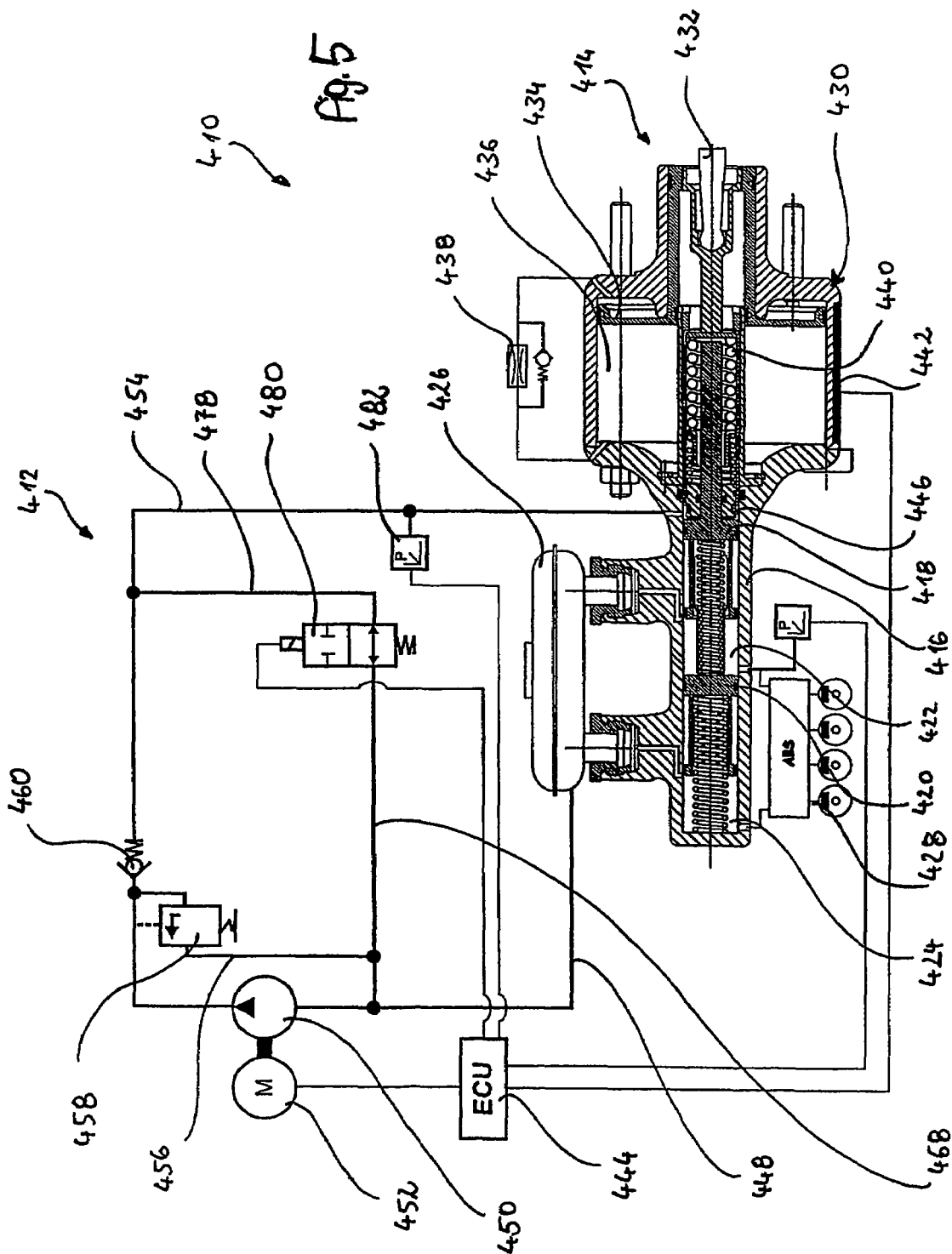

BRAKE SYSTEM FOR A MOTOR VEHICLE

CROSS-REFERENCE TO RELATED APPLICATIONS

This application is a continuation of International Application No. PCT/EP2004/003652 filed Apr. 6, 2004, the disclosures of which are incorporated herein by reference, and which claimed priority to German Patent Application No. 103 18 850.9 filed Apr. 25, 2003, the disclosures of which are incorporated herein by reference.

BACKGROUND OF THE INVENTION

The invention relates to a brake system for a motor vehicle comprising a master brake cylinder in which a primary piston for generating a brake pressure in a hydraulic brake circuit can be displaced according to actuation of a brake pedal, it being possible to displace the primary piston under the effect of a hydraulic servo pressure circuit in the master brake cylinder and the hydraulic servo pressure circuit comprising a pressure source for generating the servo pressure and a pressure accumulator for maintaining a minimum servo pressure.

Brake systems of this type are known from the prior art. Thus DE 195 42 656 A1, and corresponding U.S. Pat. No. 6,290,307 B1, both of which are incorporated by reference herein, for example discloses a brake system for a motor vehicle in which actuation of a brake pedal is detected by sensors. A servo pressure circuit is controlled by a control unit with the aid of the detected pedal actuation. A pressure source is provided in this servo pressure circuit and generates a servo pressure in the hydraulic servo pressure circuit. The pressurised hydraulic fluid is supplied by means of a manifold valve to the master brake cylinder. More precisely, the primary piston that can be displaced inside the master brake cylinder by means of the servo pressure for generating a brake pressure is also pressurised with a servo force, resulting from the servo pressure, in addition to the pedal actuation force. As a result, the primary piston can be effectively displaced inside the master brake cylinder without the entire force required for generating the brake force having to be applied by the brake pedal.

In order to be able to provide a sufficiently high servo pressure at any instant during operation, the servo pressure circuit of DE 195 42 656 A1 provides a pressure accumulator connected downstream of the pressure source. This pressure accumulator is directly coupled to the servo pressure circuit. Whenever the pressure source of the servo pressure circuit is active hydraulic fluid is conveyed from the servo pressure circuit into the pressure accumulator and stored therein. However, this has the effect that in a state in which there is a relatively low hydraulic pressure in the servo pressure circuit and in which the full power of the pressure source would be inherently required for generating a brake pressure inside the master brake cylinder for displacing the primary piston, a certain portion of the hydraulic fluid conveyed by the pressure source will also always be conveyed into the pressure accumulator owing to the fluidic connection of the pressure accumulator and pressure source. The efficiency and the response characteristic of the brake system suffers as a consequence, in particular as not all of the hydraulic fluid required for actuating the primary piston is conveyed from the servo pressure circuit into the master brake cylinder.

BRIEF SUMMARY OF THE INVENTION

It is an object of the present invention to provide a brake system of the type designated at the outset in which the servo pressure circuit operates in a manner suitable to the situation and with increased effectiveness.

This object is achieved by a brake system for a motor vehicle comprising a master brake cylinder in which a primary piston for generating a brake pressure in a hydraulic brake circuit can be displaced according to actuation of a brake pedal, it being possible to displace the primary piston under the effect of a hydraulic servo pressure circuit in the master brake cylinder and the hydraulic servo pressure circuit comprising a pressure source for generating the servo pressure and a pressure accumulator for maintaining a minimum servo pressure. To achieve said object the invention also provides that the pressure accumulator of the servo pressure circuit can be supplied with hydraulic fluid as a function of the servo pressure prevailing in the servo pressure circuit.

According to the invention, the pressure accumulator is supplied with hydraulic fluid contained in the servo pressure circuit or conveyed by the pressure source only if current operation of the entire brake system also allows it. Such a mode of supply takes place, for example, if no braking is currently being carried out which requires loading of the primary piston inside the master brake cylinder with hydraulic fluid flowing in from the servo pressure circuit. In such a situation the pressure source can be used to "load" the pressure accumulator, in other words to produce a pressure level therein which can subsequently be used in a later operating state to equalise pressure fluctuations. If, however, braking is initiated by actuation of the brake pedal, the possibility of supplying the pressure accumulator with hydraulic fluid originating from the pressure source is limited or even prevented, so hydraulic fluid conveyed by the pressure source can be supplied substantially completely to the master brake cylinder. As a result the primary piston inside the master brake cylinder can be quickly and effectively displaced for generating a brake pressure. The invention thus defies the drawbacks of the brake system according to DE 195 42 656 A1 discussed at the outset and allows operation of the various components of the servo pressure circuit in a manner suitable to the situation.

To allow selective supplying of the pressure accumulator as a function of the current operating state of the brake system and still allow reliable discharge of hydraulic fluid from the pressure accumulator to equalise pressure fluctuations it is provided in a development of the invention that the pressure accumulator is fluidically connected by a supply line and/or a discharge line to the servo pressure circuit. As a result of the construction of the brake system with two at least partially separate lines for supplying the pressure accumulator with hydraulic fluid and for discharging hydraulic fluid from the pressure accumulator it is possible to reliably achieve situation-dependent control of the pressure accumulator. However, it is also possible to provide only one line which can be used both for supplying the pressure accumulator with hydraulic fluid and for discharging hydraulic fluid from the pressure accumulator.

A development of the invention provides that the supply line comprises a fluid supply controller for controlling the supply of hydraulic fluid to the pressure accumulator as a function of the servo pressure prevailing in the servo pressure circuit. A fluid supply controller of this type can be constructed so as to be passively or actively controllable. Thus in a development of the invention it is possible that the fluid supply controller comprises a pressure-limiting valve. The pressure-limiting valve can, for example, only open if a specific minimum pressure is achieved or exceeded. This means that the pressure source in the servo pressure circuit has adjusted a sufficiently high hydraulic pressure by means of which reliable operation of the brake system, in particular reliable displacement of the primary piston inside the master brake cylinder, is possible in the event of actuation of the brake pedal. If this state is attained, the pressure-limiting valve opens and the pressure accumulator can be filled, in other words "loaded", with the hydraulic fluid conveyed by the pressure source. A corresponding pressure level is adjusted in the pressure accumulator in the process.

A further embodiment of the invention provides that the fluid supply controller comprises a throttle element. The use of a throttle element for the fluid supply controller in the supply line also allows function-dependent control of the pressure accumulator. The throttle element thus allows supplying of the pressure accumulator with hydraulic fluid conveyed by the pressure source only in the event of high hydraulic pressures. In other words, the throttle element, as a flow divider, to a certain extent also means that the hydraulic fluid conveyed by the pressure source is supplied to the master brake cylinder with higher priority and only on attaining a specific minimum pressure is a certain portion of the hydraulic fluid conveyed by the pressure source also conveyed to the pressure accumulator.

A development of the invention provides that the pressure-limiting valve and the throttle element are connected in series. A combination of this type of pressure-limiting valve and throttle valve in the supply line allows the quantity of hydraulic fluid supplied to the pressure accumulator and the pressure level that has built up therein to be limited as a result of the throttling effect of the throttle element, even in the event of the minimum pressure, preset by the pressure-limiting valve, for opening the pressure-limiting valve and for supplying the pressure accumulator being exceeded.

A pressure sensor or a plurality of pressure sensors may be provided at various points for monitoring the servo pressure prevailing in the servo pressure circuit. In this connection a development of the invention provides that the fluid supply controller comprises an actively controllable manifold valve, in particular a two-way solenoid valve. The actively controllable manifold valve can be controlled with the aid of the data captured by the pressure sensor. For example this actively controllable manifold valve can, on reaching a specific minimum pressure, be transferred from its closed state into its open state and be closed again after exceeding a specific minimum pressure in the servo pressure circuit. It is also possible to construct the pressure-limiting valve or the throttle element, both discussed above, so as to be actively controllable. Thus for example the pressure-limiting valve can also be controllable in such a way that the minimum pressure thereof that determines the operating state is changed as a function of the operating situation of the brake system. When using an actively controllable throttle element the throttling setting thereof can be changed as a function of the servo pressure currently prevailing in the servo pressure circuit.

A development of the invention provides that the discharge line is constructed with a non-return valve. To avoid undesirable hydraulic fluid flows via the discharge line the non-return valve can be used between the pressure accumulator and the hydraulic line of the servo pressure circuit connecting the pressure source to the master brake cylinder in such a way that it only allows discharge of hydraulic fluid from the pressure accumulator into the servo pressure circuit. The non-return valve can, for example, also be replaced by an actively controllable component.

With respect to the configuration of the pressure source, a development of the invention provides that the pressure source comprises a motor-driven pump. It may also be provided that the servo pressure circuit comprises a non-return valve connected downstream of the pressure source. The non-return valve is oriented such that it allows conveying of hydraulic fluid from the pressure wave source into the servo pressure circuit, in particular in the direction of the master brake cylinder, whereas it prevents flowing back of hydraulic fluid to the pressure source. Consequently it can be ensured that the servo pressure that has built up in the servo pressure circuit does not reduce in the direction of the pressure source in the event of power fluctuations in the pressure source. In particular, the non-return valve can prevent the servo pressure emanating from the pressure accumulator and exerted on the servo pressure circuit from discharging in the direction of the pressure source but in the direction of the master brake cylinder.

As described above, the servo pressure circuit is used to displace the primary piston inside the master brake cylinder to generate a brake pressure in the brake circuit. For the event that the servo pressure circuit fails, for example because the pressure source fails, it should, however, be ensured that the primary piston can also be displaced in some other way, for example by a direct mechanical coupling to the brake pedal. In such a case the situations where the actuating force acting on the primary piston simultaneously also leads to recirculation of hydraulic fluid inside the servo pressure circuit or actuation of the primary piston is obstructed owing to the occurrence of above-atmospheric pressure or a vacuum in the servo pressure circuit should be avoided. For this reason, and for general shielding of the master brake cylinder and servo pressure circuit, a development of the invention provides that the servo pressure circuit comprises an actively controllable manifold valve, in particular a two-way solenoid valve, interconnected between the master brake cylinder and the pressure source and the pressure accumulator. The servo pressure circuit can be decoupled from the master brake cylinder by means of the actively controllable manifold valve and undesirable interactions can be ruled out. This actively controllable manifold valve can also be generally used for controlling the servo pressure acting on the primary piston. It may also be used to actively fill the pressure accumulator. Thus it is possible, for example, to close the actively controllable manifold valve after a braking operation has ended and to continue to operate the pump over a predetermined period. As a result, above-atmospheric pressure is generated in the portion of the servo pressure circuit that is close to the pump and shut by the actively controllable manifold valve, it being possible to use the pressure to supply the pressure accumulator with hydraulic fluid. If at the end of braking the servo pressure in the servo pressure circuit was already sufficiently high to supply the pressure accumulator, the pump can also be switched off as early as at the end of braking and the servo pressure prevailing in the servo pressure circuit can initially be used for supplying the pressure accumulator before this is reduced in some other way, for example in the direction of a hydraulic fluid reservoir.

It may also be provided according to the invention that the servo pressure circuit comprises a further actively controllable manifold valve, in particular a two-way solenoid valve, interconnected between the master brake cylinder and the hydraulic fluid reservoir. As a result it is possible to connect the master brake cylinder to the hydraulic fluid reservoir and thus to reduce servo pressure in the servo pressure circuit after a braking operation has ended. A further manifold valve of this type may also ensure that no above-atmospheric pressure or vacuum builds up in the servo pressure circuit and obstructs or even blocks the primary piston displacement in the event of a mechanical actuation of the primary piston caused by an emergency.

The case was discussed above where pressure is no longer properly generated in the servo pressure circuit, for example owing to a failure of the pressure source. It is equally possible for the servo pressure circuit to supply excessive servo pressure which could possibly lead to an overreaction of the brake system. To prevent a scenario of this type a development of the invention provides that the servo pressure circuit comprises a bypass channel that can be activated as a function of pressure and is connected downstream of the pressure source. The bypass channel can be opened or closed as a function of the prevailing servo pressure and thus hydraulic fluid can be removed from the servo pressure circuit in the event of excessive servo pressure. During normal operation, i.e. if the servo pressure inside the servo pressure circuit is below a predetermined maximum value, the bypass channel is blocked.

A development of the invention provides that a pressure sensor for detecting the hydraulic pressure prevailing in the pressure accumulator is associated with the pressure accumulator. As already generally stated above with respect to the servo pressure circuit, a separate pressure sensor can, in particular, also be associated with the pressure accumulator. The instantaneous "loading state" of the pressure accumulator can therefore be ascertained and evaluated with the aid of the pressure prevailing in the accumulator, for example to the extent that in the event of a specific minimum pressure not being attained inside the pressure accumulator and with the pressure source power simultaneously being available an active fluid supply control element is opened and hydraulic fluid is supplied to the pressure accumulator for increasing the accumulator pressure.

Reference should be made to the fact that a low-pressure accumulator is preferably used as the pressure accumulator, the maximum accumulator pressure of which is limited. While a low-pressure accumulator of this type is suitable only for temporarily bridging a pressure drop, for example owing to starting delays in the motor drive of the pressure source, it does have the advantages that it is inexpensively available, requires only a small installation space and is usually sufficient during operation. The main load of the pressure generation generally falls to the pressure source anyway. With respect to the use of a low-pressure accumulator, a pressure sensor associated therewith satisfies the further task of also detecting attainment of a maximum pressure, whereupon an additional hydraulic fluid is to be supplied to the pressure accumulator in order to prevent damage or destruction to the low-pressure accumulator. Obviously the maximum pressure value to be detected by the pressure sensor should be selected with sufficient security with respect to a pressure value at which damage can actually occur to the pressure accumulator.

As already illustrated above, the brake system according to the invention can be constructed with a large number of active components and pressure sensors. In this connection a development of the invention provides a controller for evaluating detected hydraulic pressures and for evaluating actively controllable components. The controller can, for example, be formed by an electronic data processing system present in a motor vehicle anyway. It can, however, also be formed by a separate data processing system with a separate processor.

In the above description, it was generally illustrated that the brake system operates according to actuation of the brake pedal. This can mean that, on the one hand, the actuating force exerted on a brake pedal is mechanically transmitted to the primary piston and that actuation of the primary piston is assisted by the servo pressure circuit. In other words the pedal actuating force can be detected and accordingly intensified by the servo pressure circuit. As an alterative to this it is also possible, during normal operation, to completely mechanically decouple the primary piston and its movement from brake pedal actuation. This means that pedal actuation is accordingly no longer transmitted directly to the primary piston, rather the energy causing it dissipates. The primary piston is displaced in such a configuration of the brake system according to the invention exclusively during normal operation, under the effect of the servo pressure circuit. As a result, during normal operation the servo pressure circuit alone is responsible for displacement of the primary piston. For emergency operation, in which, for example, a component of the servo pressure circuit fails, a mechanical coupling of brake pedal and primary piston may be provided and be produced, for example, after bridging a movement pedal.

The invention also relates to a brake system for a motor vehicle comprising a master brake cylinder, in particular of the above-described type, in which, according to actuation of a brake pedal, but mechanically decoupled therefrom, a primary piston can be displaced for generating a brake pressure in a hydraulic brake circuit, it being possible to displace the primary piston under the effect of a hydraulic servo pressure circuit in the master brake cylinder and the hydraulic servo pressure circuit comprising a pressure source for generating the servo pressure. For the development of the invention it is provided that the servo pressure circuit comprises a bypass channel that can be activated as a function of pressure and is connected upstream of the master brake cylinder.

Other advantages of this invention will become apparent to those skilled in the art from the following detailed description of the preferred embodiment, when read in light of the accompanying drawings.

BRIEF DESCRIPTION OF THE DRAWINGS

FIG. 4 shows a general diagram according to FIG. 1 to 3 of a fourth embodiment of a brake system according to the invention and FIG. 5 shows a general diagram according to FIG. 1 to 4 of a fifth embodiment of a brake system according to the invention;

DETAILED DESCRIPTION OF THE INVENTION

Figure 1:
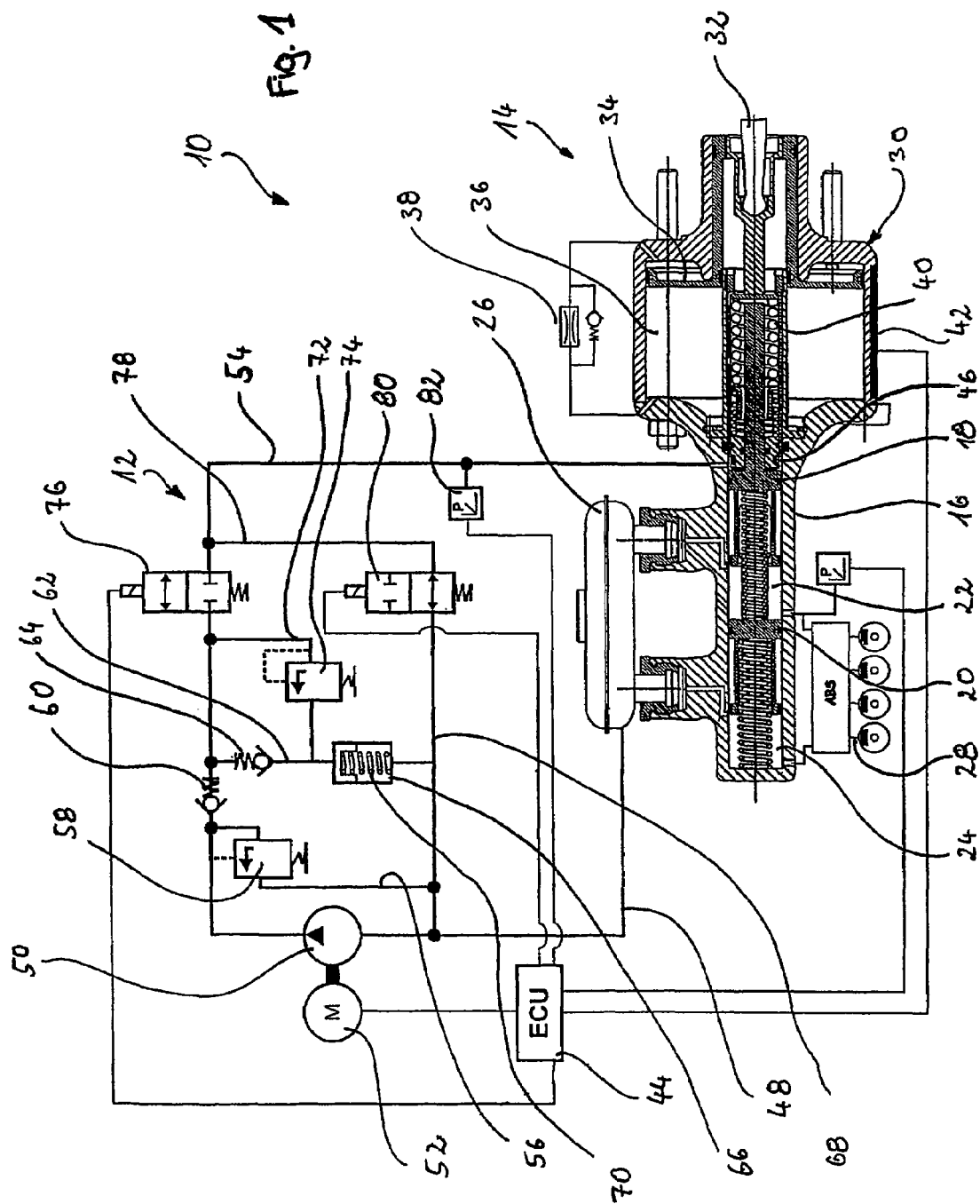
FIG. 1 shows a schematic general diagram of a first embodiment of a brake system according to the invention.

FIG. 1 shows a first embodiment of a brake system according to the invention which is designated in general by 10. It comprises a servo pressure circuit 12 and a brake cylinder subassembly 14.

The brake cylinder subassembly 14 comprises a master brake cylinder 16 in which a primary piston 18 is displaceably guided. A secondary piston 20 is also displaceably guided in the master brake cylinder 16 and mechanically coupled to the primary piston 18 by a spring arrangement.

The primary piston 18, with the master brake cylinder 16 and the secondary piston 20, encloses a primary pressure chamber 22. The secondary piston 20, with the master brake cylinder 16, encloses a secondary pressure chamber 24. The primary pressure chamber 22 and the secondary pressure chamber 24 are fluidically coupled by respective supply channels to a hydraulic fluid accumulator 26 for supplying hydraulic fluid in the rest state shown in FIG. 1. The primary pressure chamber 22 and the secondary pressure chamber 24 are also fluidically coupled to a brake system 28 which, in a manner known per se, can bring about deceleration of the wheels of a motor vehicle.

The brake cylinder subassembly 14 also comprises a pedal simulation device 30. In detail, the pedal simulation device 30 comprises a force input member 32 mechanically coupled to a brake pedal and which is workingly connected to a working piston 34. The working piston 34 can be displaced in a piston chamber 36, it limiting working chambers on either side inside the piston chamber 36. A gas contained in the working chambers on either side of the working piston 34 is displaced from one working chamber through a throttle 38 (as shown in FIG. 1) into the respective other working chamber by a displacement of the working piston 34 inside the piston chamber 36 and, as a result, due to the effect of the throttle 38 a resistance to a movement of the force input member 32 is generated. A resistance which results from a simulation spring arrangement 40 acts on the force input member 32 in addition to the pneumatically generated resistance. This simulation spring arrangement 40 is constructed in multiple stages, i.e. it comprises a spring with low spring hardness and a spring with increased spring hardness which can be reduced by steps, i.e. compressed with a progressive spring characteristic.

Any pedal actuation, i.e. any displacement of the force input member 32, is detected by a position sensor 42, the position sensor 42 emitting a position signal to an electronic control unit 44, with the aid of which the existence of a pedal actuation can be ascertained.

The brake system 10 according to FIG. 1 is designed in such a way that a pedal actuation, and a displacement of the force input member 32 resulting therefrom, is not mechanically transmitted to the primary piston 18, rather the energy applied during the pedal actuation is dissipated in the brake system 10. To carry out braking, hydraulic pressure is generated in an actuating pressure chamber 46 by means of the servo pressure circuit 12, which pressure displaces the primary piston 18, and consequently the secondary piston 20, and as a result provides for a pressure build up in the primary pressure chamber 22 and in the secondary pressure chamber 24. The primary piston 18 is thus completely mechanically decoupled from the force input member 32 during normal operation of the brake system 10.

The construction of the servo pressure circuit 12 is to be described hereinafter. The servo pressure circuit 12 is supplied with hydraulic fluid from the hydraulic fluid reservoir 26. This is conveyed from the hydraulic fluid reservoir 26 via a supply line 48 by a pump 50 which is driven by a motor 52. The pump 50 is fluidically coupled by a hydraulic fluid supply line 54 to the actuating pressure chamber 46. A branch 56, which is connected in parallel with the pump 50 and which comprises a pressure-limiting valve 58, is provided in the hydraulic fluid supply line 54 so as to issue from the pump 50. A non-return valve 60 is accordingly integrated into the hydraulic fluid supply line 54 and allows fluid to flow from the pump 50 into the actuating pressure chamber 46, but blocks a flow of fluid in the opposite direction. A discharge line 62 comprising a non-return valve 64 subsequently opens into the hydraulic fluid supply line 54. The non-return valve 64 is oriented in such a way that it blocks a flow of fluid from the hydraulic fluid supply line 54 into the discharge line 62 but allows fluid to flow in the opposite direction. A pressure accumulator 66 is coupled to the discharge line 62. The pressure accumulator 66 is constructed as a low-pressure accumulator and is configured in such a way that hydraulic fluid can be stored therein up to a specific maximum pressure. The pressure accumulator is constructed in an inherently conventional manner and is coupled at its side remote from the non-return valve 64 to a backflow line 68. The pressure accumulator 66 also comprises a spring element 70 which is used for pressure accumulation.

A supply line 72 subsequently branches from the hydraulic fluid supply line and is likewise provided with a pressure-limiting valve 74. The supply line 72 is hydraulically coupled to the pressure accumulator 66.

Starting from the branching of the supply line 72, a two-way valve 76 that can be actively controlled by the electronic control unit 44 is arranged in the further course of the hydraulic fluid supply line 54. This, as shown in FIG. 1, can be switched into a closed state and into an open state. Finally, a further bypass channel 78, which likewise comprises a two-way valve 80 that can be controlled by the electronic control unit 44, adjoins the further course of the hydraulic fluid supply line 54. A further pressure sensor 82, which detects the servo pressure currently prevailing in the hydraulic fluid line 54 and forwards it to the electronic control unit 44 in the form of a corresponding signal, is arranged in the further course of and on the hydraulic fluid supply line 54.

The servo pressure circuit 12 functions as follows. The motor 52, which motively drives the pump 50, is controlled according to the control of the electronic control unit 44. The pump conveys hydraulic fluid from the hydraulic fluid reservoir 26 into the hydraulic fluid supply line 54. The actuating pressure chamber 46 is supplied with hydraulic fluid by the hydraulic fluid supply line 54, so a pressure builds up in this chamber, if required, which pressure, in the event of actuation of the brake pedal and displacement of the force input member 32, leads, without mechanical coupling of force input member 32 and primary piston 18, to the primary piston 18 being displaced to the left in FIG. 1 under the effect of the hydraulic pressure that has built up in the actuating chamber 46. As a result, a hydraulic pressure builds up in the primary pressure chamber 22 and, with displacement of the secondary piston 20, in the secondary pressure chamber 24.

With sufficiently high servo pressure in the hydraulic fluid supply line 54, the pressure-limiting valve 74 opens in the supply line 72, so hydraulic fluid can flow into the pressure accumulator 66 via the supply line 72. If, however, the servo pressure prevailing in the hydraulic fluid supply line 54 exceeds a maximum value, the pressure-limiting valve 58 opens and short-circuits the entire portion of the servo pressure circuit 12 adjoining the branch 56. As a result, overburdening of the servo pressure circuit 12 may be prevented. If, on the other hand, the servo pressure prevailing in the hydraulic fluid supply line 54 sinks below a specific minimum value, and if the pressure accumulator 66 is sufficiently "loaded", the pressure accumulator 66 can, if required, temporarily equalise a drop in pressure. Such a drop in pressure can, for example, come about because an actuation of the brake pedal (not shown) switches the two-way valve 46 over from its closed position shown in FIG. 1 into an open state and servo pressure is thus supplied from the servo pressure circuit 12 to the actuating pressure chamber 56. However, owing to a starting delay of the motor 52 the pump 50 cannot build up servo pressure in the servo pressure circuit 12 quickly enough, so a pressure drop briefly occurs. This is equalised by the pressure accumulator 66. The two-way valve 76, controlled by the electronic control unit 44 according to the signal obtained by the position sensor 42 and further signals, for example from the pressure sensor 82, thus acts as an activating element for activation of the servo pressure circuit 12. The two-way valve 80 also acts as a pressure relief valve for the hydraulic fluid supply line 54. It is switched into its open position shown in FIG. 1, for example, if there is no brake actuation and thus a build up of pressure is not necessary in the actuating pressure chamber 46 either. As a result, it may also allow pressure equalisation between the master brake cylinder and the reservoir 26. This is significant in particular with respect to a possible defect in the servo pressure circuit 12 during which the primary piston 32 can be mechanically moved. Opening the two-way valve 80 prevents such a mechanical movement of the primary piston 32 from being obstructed by above-atmospheric pressure or a vacuum occurring in the servo pressure circuit 12 as a result. As soon as, during normal operation with a completely functional servo pressure circuit 12, a brake actuation is detected by the position sensor 42 the two-way valve 80 is switched into its closed position so hydraulic fluid can be supplied by the hydraulic fluid line 54 to the actuating pressure chamber 46.

A fundamental aspect of the invention lies in the fluidic connection of the pressure accumulator 66 in the servo pressure circuit 12. In the solution shown in FIG. 1, it is possible for the pressure accumulator 66 to be supplied with hydraulic fluid if there is a sufficiently high servo pressure in the servo pressure circuit 12, i.e. if the pump 50 conveys enough hydraulic fluid from the hydraulic fluid accumulator 26. The pressure accumulator 66, if it is appropriately loaded, can equalise pressure fluctuations inside the servo pressure circuit 12. This is necessary for example if pressure cannot be built up sufficiently quickly in the servo pressure circuit 12 owing to abrupt braking and owing to a starting delay in the unit comprising pump 50 and motor drive 52.

For supplying the pressure accumulator there is also the possibility that the two-way valve 76 is closed after a braking operation has ended and the pump 50 continues to be operated over a predetermined period. As a result hydraulic pressure, which can be used to load the pressure accumulator 66, builds up in the portion of the hydraulic fluid supply line 54 between the pump 50 and the two-way valve 76. In the event that the servo pressure is already sufficiently high once the braking operation has ended, in order to load the pressure accumulator 66 the pump 50 can also be directly switched off once the braking operation has ended and when the two-way valve 80 is closed and the two-way valve 76 is open the pressure accumulator 66 can be loaded.

Figure 2:
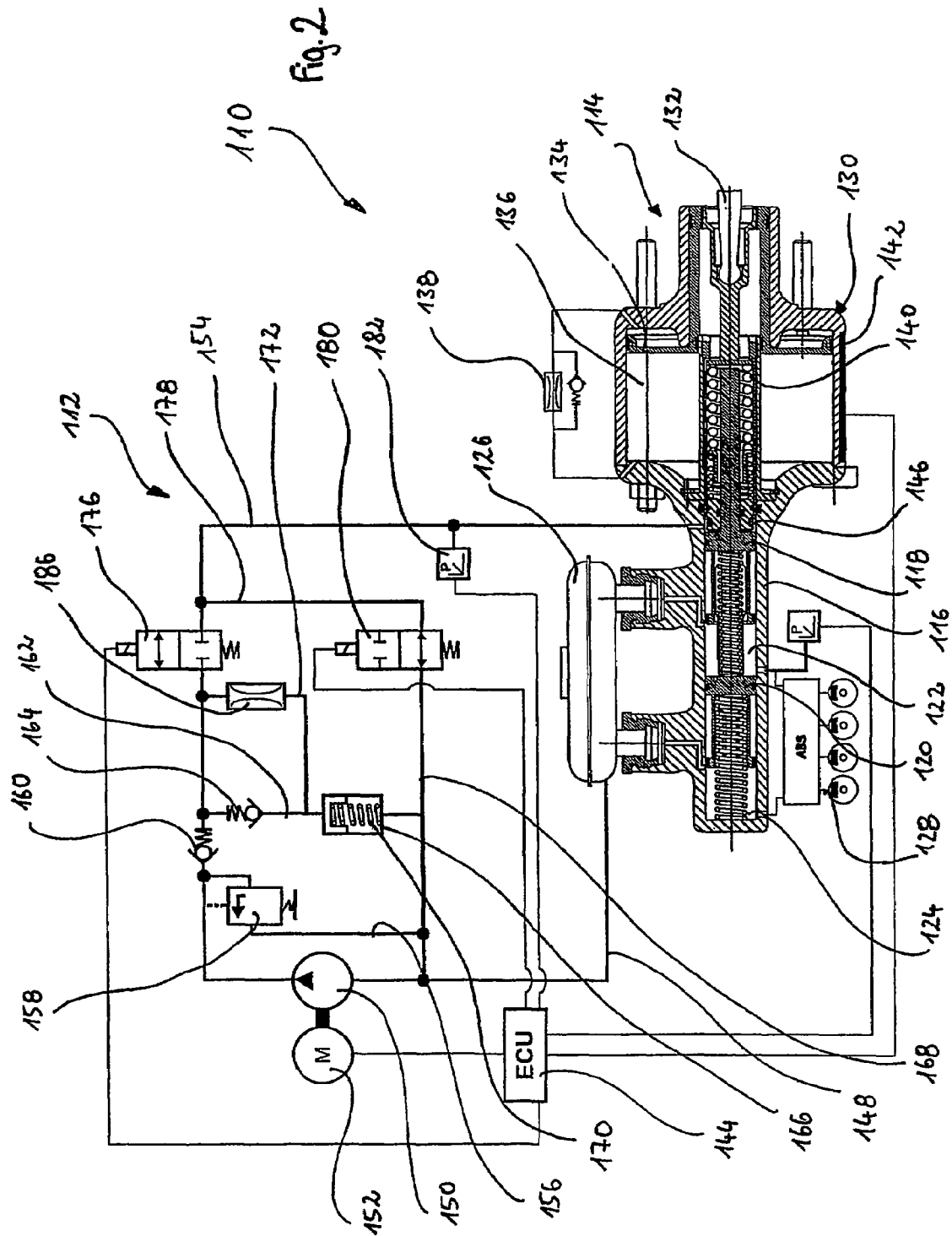
FIG. 2 shows a general diagram according to FIG. 1 of a second embodiment of a brake system according to the invention.

FIG. 2 shows a second embodiment of the brake system according to the invention. To provide a simpler description and to avoid repetitions only the differences from the first embodiment according to FIG. 1 shall be described. The same reference numerals as in the description of the first embodiment according to FIG. 1 will be used for identical or identically-acting components, but will be preceded by the number "1".

The only difference between the embodiment according to FIG. 1 and the second embodiment according to FIG. 2 lies in the fact that, in the supply line 172, the pressure-limiting valve 74 provided in FIG. 1 was been replaced in FIG. 2 by a throttle element 186. The throttle element 186 fulfils the function of limiting a supply of hydraulic fluid via the supply line 172 to the pressure accumulator 166 as a function of pressure. The throttle element 186 is used as a volume flow divider, the larger portion of the volume flow conveyed by the pump 150 flowing through the hydraulic fluid supply line 154 from the pump 150 into the actuating pressure chamber 146 and only a small portion is supplied via the throttle element 186 and the supply line 172 to the pressure accumulator 166. However, in the event of high servo pressure inside the hydraulic fluid supply line 154 a sufficiently high quantity of hydraulic fluid is supplied via the throttle element 186 and the supply line 172 to the pressure accumulator 166 and the latter loaded thereby. A gas contained in the working chambers on either side of the working piston 134 is displaced from one working chamber through a throttle 138 (as shown in Fin. 2) into the respective other working chamber by a displacement of the working piston 134 inside the piston chamber 136.

The remaining mode of operation of the brake system 110 corresponds to the mode of operation of the brake system 10 from FIG. 1 and illustrated in detail.

Figure 3:
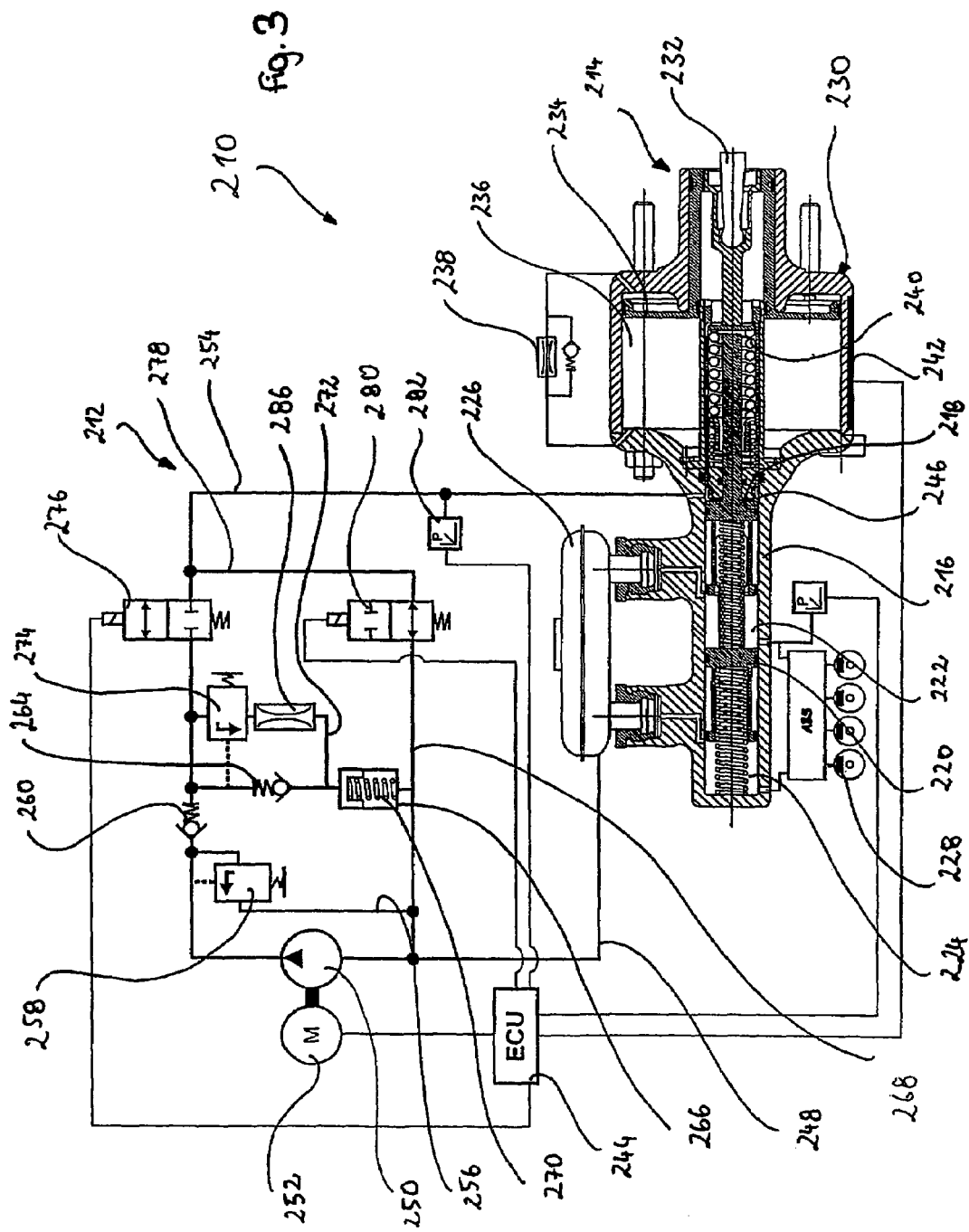
FIG. 3 shows a general diagram according to FIGS. 1 and 2 of a third embodiment of a brake system according to the invention.

FIG. 3 shows a third embodiment of a brake system according to the invention. Again only the differences from the embodiments according to FIGS. 1 and 2 will be described to avoid repetitions. For this purpose, use will again be made of the reference numerals from the preceding description of the embodiments according to FIGS. 1 and 2 for identically-acting and identical components, the reference numerals being preceded by the number "2".

The embodiment according to FIG. 3 shows a combination of the two embodiments according to FIG. 1 and 2. Firstly the pressure-limiting valve 274 and following it the throttle element 286 are connected in series into the supply line 272. As a result it is possible to throttle the hydraulic flow via the throttle element 286 even in the event of sufficiently high servo pressure inside the servo pressure circuit 212 at which the pressure-limiting valve 274 opens for supplying the pressure accumulator 266. As a result the quantity of hydraulic fluid supplied to the pressure accumulator 266 and the hydraulic pressure that has built up therein can be reduced, even in the event of sufficiently high hydraulic pressure, as the throttle element 286 again acts as a volume flow divider. With this solution it is possible, in any pressure region, as long as it lies below the maximum pressure value determining the function of the pressure-limiting valve 258, to moderately supply the pressure accumulator 266. A construction of this type is recommended in particular when using a low-pressure accumulator 266 which is to be protected from being supplied with excessive hydraulic pressure. A gas contained in the working chambers on either side of the working piston 234 is displaced from one working chamber through a throttle 238 (as shown in FIG. 3) into the respective other working chamber by a displacement of the working piston 234 inside the piston chamber 236.

Apart from that the brake system 210 according to FIG. 3 functions as described above with reference to FIG. 1 with respect to the first embodiment.

FIG. 4 shows a fourth embodiment of the brake system according to the invention. Again only the differences from the preceding embodiments according to FIG. 1 to 3 are to be described. The same reference numerals, as were used in the description of FIG. 1 to 3, will again be used for this description for identical or identically-acting components but will be preceded by the number "3".

In the fourth embodiment according to FIG. 4, a two-way valve 388, which can be controlled by the electronic control unit 344, is fitted into the supply line 372 leading from the hydraulic fluid supply line 354 to the pressure accumulator 366. The supply line 372 also comprises a pressure sensor 390 between the pressure accumulator 366 and the two-way valve 388. The hydraulic pressure prevailing in the pressure accumulator 366 can be detected by means of the pressure sensor 390. If this hydraulic pressure falls below a predetermined minimum value and the pump 350 supplies a sufficiently high servo pressure in the servo pressure circuit 312 the two-way valve 388 is switched from its closed position shown in FIG. 4 into the open position. The hydraulic fluid can thus flow unhindered from the hydraulic fluid supply line 354 into the pressure accumulator 366 and thus load the pressure accumulator 366. The change in the pressure level in the pressure accumulator 366 during this loading process is monitored by the pressure sensor 390 and the electronic control unit 344. As soon as a desired level or a maximum permitted pressure level is attained in the pressure accumulator 366 the pressure sensor 390 detects this and emits a corresponding signal to the electronic control unit 344. The unit then controls the two-way valve 388 so the latter returns to its closed position shown in FIG. 4 and thus the fluidic connection via the supply line 372 to the hydraulic fluid supply line 354 is broken. The pressure accumulator 366 may thus be purposefully loaded as a function of pressure by active switching of the two-way valve 388 with the embodiment according to FIG. 4. A gas contained in the working chambers on either side of the working piston 334 is displaced from one working chamber through a throttle 338 (as shown in FIG. 4) into the respective other working chamber by a displacement of the working piston 334 inside the piston chamber 336.

Apart from that the brake system according to FIG. 4 functions as described above with respect to FIG. 1 to 3 with regard to embodiments 1 to 3.

It should also be noted that, owing to the effect of the two-way valve 388, the discharge line 362 can be omitted in a development (not shown) of the embodiment according to FIG. 4. The pressure accumulator 366 is supplied and emptied via the line 372 in this case.

FIG. 5 shows a fifth embodiment of the brake system according to the invention. Again only the differences from the above-described embodiments according to FIG. 1 to 4 are to be described. The same reference numerals as above for the description of FIG. 1 to 4 will be used for identically-acting and identical components, but they will be preceded by the number "4".

In the fifth embodiment according to FIG. 5, the servo pressure circuit 412 is illustrated in a highly simplified manner compared with the above-described embodiments. The circuit includes only a pressure source comprising pump 450 and motor 452 and which can be short-circuited by the branch 456 and the pressure-limiting valve 458 located therein. The non-return valve 460 is also provided as is the bypass channel 478 with the two-way valve 480 integrated therein and controllable by the electronic control unit 444.

In this embodiment of the brake system according to the invention the pump 450 and the motor 452 are constructed in such a way that on activation by a brake pedal actuation, they can react sufficiently quickly without starting delay and thus a servo pressure can build up sufficiently quickly inside the servo pressure circuit 412, which pressure then provides for a displacement of the primary piston 418 in the actuating pressure chamber 446. Such a fast-reacting construction of the pressure source, comprising pump 450 and motor drive 452 allows a much simplified construction of the servo pressure circuit. A gas contained in the working chambers on either side of the working piston 434 is displaced from one working chamber through a throttle 438 (as shown in FIG. 5) into the respective other working chamber by a displacement of the working piston 434 inside the piston chamber 436.

The invention shows a simple and reliable possibility for providing a master brake cylinder with a servo pressure according to a brake pedal actuation.

Reference should be made to the fact that the invention was described in connection with a brake system in which, during normal operation, complete mechanical decoupling is provided between primary piston and force input member. It is, however, equally possible to use the invention in brake systems in which there is no such mechanical decoupling between force input member (and thus the brake pedal) and primary piston and the servo pressure only acts in a supportive manner to displace the primary piston directly moved by actuation of the brake pedal.

In accordance with the provisions of the patent statutes, the principle and mode of operation of this invention have been explained and illustrated in its preferred embodiments. However, it must be understood that this invention may be practiced otherwise than as specifically explained and illustrated without departing from its spirit or scope.

What is claimed is:

1. Brake system for a motor vehicle comprising a master brake cylinder in which a primary piston for generating a brake pressure in a hydraulic brake circuit can be displaced according to actuation of a brake pedal, it being possible to displace the primary piston under the effect of a hydraulic servo pressure circuit in the master brake cylinder and the hydraulic servo pressure circuit comprising a pressure source for generating the servo pressure and a pressure accumulator for maintaining a minimum servo pressure in the servo pressure circuit, wherein a fluid supply controller comprises a throttle element and in that a discharge line is constructed with a non-return valve which only allows discharge of hydraulic fluid from the pressure accumulator into the servo pressure circuit, and wherein the throttle element limits a supply of hydraulic fluid through a supply line to the pressure accumulator, wherein the servo pressure circuit comprises a manifold two-way solenoid valve, that is actively controllably interconnected between the master brake cylinder and the pressure source and the pressure accumulator, wherein the servo pressure circuit comprises a further manifold two-way solenoid valve, that is actively controllably interconnected between the master brake cylinder and a hydraulic fluid reservoir.

2. Brake system according to claim 1, wherein a pressure sensor is arranged in the servo pressure circuit for detecting the servo pressure.

3. Brake system according to claim 1, wherein the pressure source comprises a motor-driven pump.

4. Brake system according to claim 1, wherein the servo pressure circuit comprises a non-return valve connected downstream of the pressure source.

5. Brake system according to claim 1, wherein the servo pressure circuit comprises a bypass channel that can be activated as a function of pressure and is connected downstream of the pressure source.

6. Brake system according to claim 1, further comprising a controller for evaluating detected hydraulic pressures and for controlling actively controllable components.

7. Brake system according to claim 1, wherein the primary piston is mechanically decoupled from the brake pedal.

8. Brake system for a motor vehicle comprising a master brake cylinder in which a primary piston for generating a brake pressure in a hydraulic brake circuit can be displaced according to actuation of a brake pedal, it being possible to displace the primary piston under the effect of a hydraulic servo pressure circuit in the master brake cylinder and the hydraulic servo pressure circuit comprising a pressure source for generating the servo pressure and a pressure accumulator for maintaining a minimum servo pressure in the servo pressure circuit, wherein a fluid supply controller comprises a throttle element and in that a discharge line is constructed with a non-return valve which only allows discharge of hydraulic fluid from the pressure accumulator into the servo pressure circuit, wherein the servo pressure circuit comprises a first manifold two-way solenoid valve, that is actively controllably interconnected between the master brake cylinder and the pressure source and the pressure accumulator, and wherein the servo pressure circuit comprises a second manifold two-way solenoid valve, that is actively controllably interconnected between the master brake cylinder and a hydraulic fluid reservoir.

9. Brake system for a motor vehicle comprising a master brake cylinder in which a primary piston for generating a brake pressure in a hydraulic brake circuit can be displaced according to actuation of a brake pedal, it being possible to displace the primary piston under the effect of a hydraulic servo pressure circuit in the master brake cylinder and the hydraulic servo pressure circuit comprising a pressure source for generating the servo pressure and a pressure accumulator for maintaining a minimum servo pressure in the servo pressure circuit, wherein a discharge line is constructed with a non-return valve which only allows discharge of hydraulic fluid from the pressure accumulator into the servo pressure circuit, wherein the servo pressure circuit comprises a first manifold valve, in particular a two-way solenoid valve, that is actively controllably interconnected between the master brake cylinder and the pressure source and the pressure accumulator, wherein the servo pressure circuit comprises a second manifold valve, in particular a two-way solenoid valve, that is actively controllably interconnected between the master brake cylinder and a hydraulic fluid reservoir, wherein the pressure source is fluidly coupled by a fluid supply line to an actuating pressure chamber of the master cylinder, and wherein a pressure limiting valve is provided in the fluid supply line.

* * * * *